F. E. CASE.
MOTOR CONTROL SYSTEM.
APPLICATION FILED NOV. 21, 1914.
1,200,310.
Patented Oct. 3, 1916.
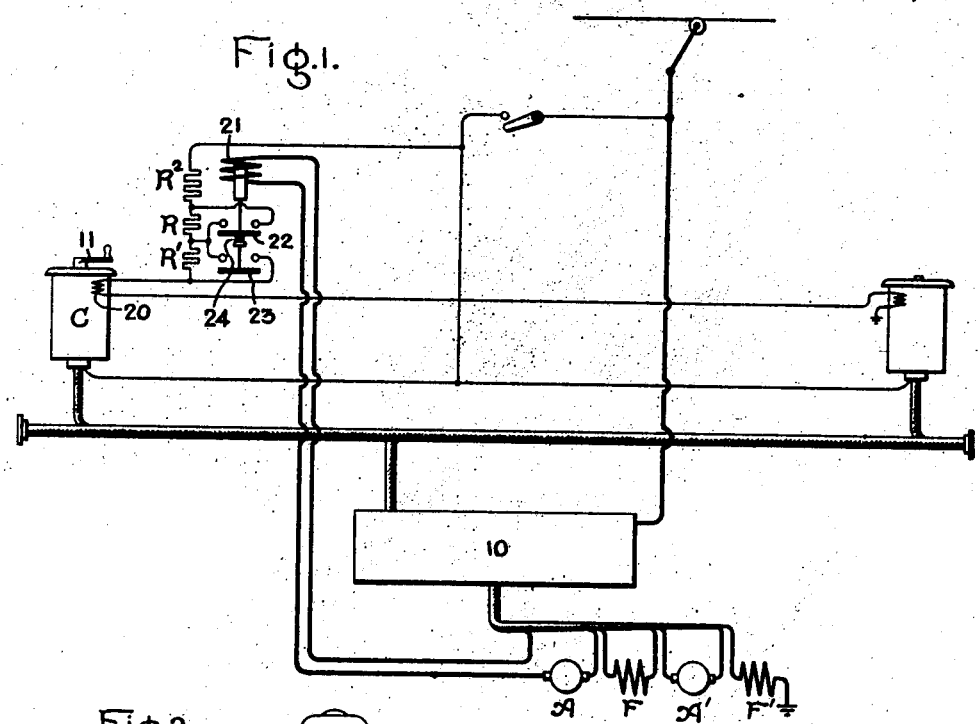
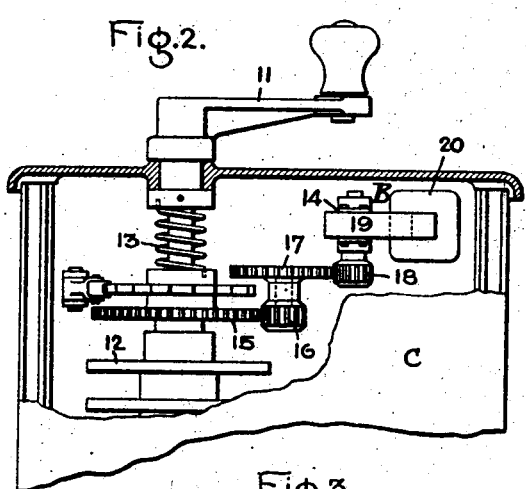
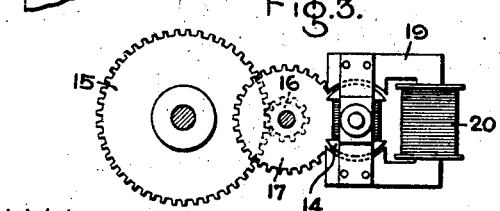
Witnesses:
Helen Orford
Margaret E. Woolley
Inventor:
Frank E. Case,
by Albert G. Davis
His Attorney.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

MOTOR-CONTROL SYSTEM.

1,200,310.   Specification of Letters Patent.   Patented Oct. 3, 1916.

Application filed November 21, 1914. Serial No. 873,392.

*To all whom it may concern:*

Be it known that I, FRANK E. CASE, a citizen of the United States, residing at Schenectady, county of Schenectady, State of New York, have invented certain new and useful Improvements in Motor-Control Systems, of which the following is a specification.

This invention relates to the control of electric motors and has for its object the provision of improved means whereby an electric motor may be started, and brought up to speed in a reliable, safe and efficient manner.

My invention relates more specifically to the control of electric motors by automatic or semi-automatic means. In the operation of motor controllers of this general type, it is common to have the operation of the controller under the control of the motor current so that the cutting out of resistance or other starting operation will be stopped upon each rise of current until the current falls to a predetermined value, and a safe value of current will not therefore be exceeded. It is frequently desirable, however, that the limiting current value should vary to suit operating conditions. This is particularly true of control for electric railways where the duty is frequently quite severe, for instance, on rounding sharp curves or ascending a heavy grade. Under these conditions, the normal speed of starting would be too high and the slipping point of the wheel would be reached and while it is desirable that the limiting current should be in excess of that normally permitted so as to give the necessary torque to the motors, it is also desirable that the controller should be operated more slowly under this high current condition instead of being stopped, as is common practice. In other words, when the conditions require a heavy current the controllers will be permitted to operate more slowly than when the current is light, but the operation of the controller should not be positively stopped. Likewise when the current is light, as in the case where the normal running current exists, that is, when the motor is operated at full speed the controller should be capable of being operated more rapidly. When, for instance, the controller is in full speed position and the motors have reached running speed, if for any reason the operator should turn the controller to the off position for an instant and should immediately turn it on again, as frequently occurs in practice, the operation of the controller back to the point where it had been should be as rapid as possible.

One of the objects of my invention is to provide a controller which will operate in the manner above described. One very effective means for producing the desired retarding effect is by the use of an electromagnetic retarding device which will have a greater retarding effect when the current is heavy than when it is light. The arrangement is preferably such that at least three speeds of acceleration are permitted—first, the maximum speed when the motor current is at normal or below; second, the acceleration speed during ordinary starting conditions; and third, the acceleration speed when the load conditions are severe. One method of accomplishing this result is by the use of current relay which has three positions for the three different values of operating current, each position producing a different retarding effect upon the controller.

Other objects and purposes of my invention will appear in the course of the following specification in which I have shown my invention embodied in concrete form for purposes of illustration.

In the drawing illustrating my invention, Figure 1 is an illustrative diagram of my invention applied to a train control system; Fig. 2 is a view of the controller partly broken away to show the details; Fig. 3 shows a detail of the retarding device; and Figs. 4 and 5 show connections for a modified form of my invention.

Referring to Fig. 1 it will be seen that I have illustrated my invention in connection with a series parallel control for electric motors of the multiple unit type, although it will be obvious that my invention is in no sense limited to this particular type or system of control. In this diagram, A and A' represent the armatures, and F and F' the fields, respectively, of the traction motors. These motors are controlled in the well known manner by means of contactors (not shown) located in the box 10. A master controller C controls these contactors in a manner well understood in the art and I have shown it of the drum type for this purpose. This master controller is such as to provide for automatic or semi-automatic operation, that is, when the operator moves the controller to a definite position the connections are made automatically under the control of the motor current so as to bring the motor or motors up to the speed corresponding to the position of the master controller.

Referring to Fig. 2, it will be seen that the controller handle 11 is connected to the controller cylinder 12 by a spring 13, so that when the controller handle is turned, the spring will be placed under tension and the cylinder will follow the handle as fast as it is permitted. The operator may turn the controller handle to the position representing full speed operation, but the cylinder which controls the circuits is under the control of the motor current, and cannot operate fast enough to cause damage to the motors. In order to retard the cylinder more or less dependent upon the current without actually stopping it, I provide an electromagnetic retarding device B which is in the nature of an electric motor, the armature of which is short-circuited while the field excitation depends upon the value of the current in the main motors. The armature 14 is geared to the cylinder 12 so as to be operated at a high speed with reference to the cylinder by means of the gears 15, 16, 17 and 18. This armature operates in a magnetic field comprising a magnetic structure 19 and a winding 20 for magnetizing the same. It is obvious that if the current in the winding 20 is relatively high the excitation will be high, and therefore the controller will be retarded to a greater extent than if the exciting current were low.

In order to give predetermined values of excitation, and hence predetermined rates of retardation, I have shown in Fig. 1 a relay operated by the motor current to control a resistance in series with the field winding 20. The operating winding 21 of the relay is in the motor circuit and is provided with two switch contacts 22 and 23 which control sections R and R' respectively. The switch contact 22 is mounted on a spring 24 which must be compressed in order that the switch contact 23 shall close. Resistance $R^2$ will remain in series with the field winding. The adjustment of the relay is such that at the normal running current of the motor, the contacts will not be operated. When the motor is started under normal load conditions the current will be sufficient to operate the relay to close contact 22 to short circuit the resistance R. When the current becomes still higher, due to the more severe operating conditions, as, for instance, in ascending a grade or rounding a sharp curve, the current is sufficient to raise the plunger of the relay still farther and close the contact 23. This will short circuit the resistance R' and increase the field excitation of the retarding device and slow down the operation of the controller.

As thus constructed and arranged, the operation of my device is as follows: To start the car or train, the operator turns the handle 11 to the position corresponding to the speed desired. He may turn to the series-parallel position in the type of control which I have illustrated, or he may turn it to the full parallel position representing full speed. In either case, the cylinder which makes the circuit connections will be operated slowly owing to the retardation of the retarding device. Assuming that the operator is starting on an ordinary stretch of straight level track, the starting current will be sufficient to cause the relay to operate to close the contact 22. This will short circuit the resistance R and increase the field excitation of the retarding device. The retarding effect will be such as to permit the cylinder to operate at the proper speed under existing load conditions. The cylinder will continue to rotate, making the necessary connections, until it reaches the position predetermined by the operator. If, after the train has been brought up to the speed required by the position of the operating handle, the operator should throw off his controller, as for instance, where a danger signal is flashed for an instant and then cleared, the relay will drop and will not close at the normal running current, so that the operator will be able to move the controller handle back to the position from which it was moved without being retarded, or at least with the maximum speed permitted by the retarding device. If the train should be started on a grade or curve, or under other severe load conditions, the current in the relay will be sufficient to close the contact 23, thereby short circuiting the resistance R' in addition to the resistance R, and further increasing the excitation of the retarding device. Under these conditions the cylinder of the controller will be moved to make the proper connections, but will be moved much more slowly than under the other conditions mentioned. This will enable the operator to start under severe load conditions without endangering the motors or slipping the wheels.

In Figs. 4 and 5 I have shown the retarding device arranged in a somewhat different manner. In this case the winding of the retarding device is itself in the motor circuit and the relay is dispensed with. This has the disadvantage that the winding will be very heavy, although this disadvantage may be overcome by the arrangement shown in Fig. 5, in which the winding is connected across the series field. Neither of these devices, however, has the advantage of giving predetermined and definite retardation values, which in most cases would be an advantage over the gradually varying retardation value which depends upon the gradually varying current.

It will be seen that I have disclosed a motor controller of a simple form in which while the motor starting is done under the control of the motor current the operator is not unduly hampered in the control, but is enabled to meet the severe load conditions as they arise without danger.

While I have described my invention as embodied in concrete form and as operating in a specific manner for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A control system for electric motors comprising a controller, retarding means under the control of the motor current for limiting the speed of operation of the controller and means for decreasing said retarding effect when the controller is moving toward full running position after it has been moved to the off position for an instant.

2. A control system for electric motors comprising a controller, means for causing said controller to advance automatically to start the motor, an electro-magnetic retarding device for said controller, and a relay operated at predetermined values of motor current to produce corresponding changes in the retarding effect of said device.

3. A control system for electric motors comprising a controller, means for causing said controller to advance automatically to start the motor, a retarding device for said controller, and a relay moved by the motor current to predetermined positions depending upon the value of the operating current to produce changes in the retarding effect of said device.

4. A control system for electric motors comprising a controller, means for causing said controller to advance automatically to start the motor, and retarding means under the control of the motor current for limiting the speed of operation of said controller said means normally permitting maximum speed of operation and being unaffected by currents below the normal running current of the motor.

5. A control system for electric motors comprising a controller, means for causing said controller to advance automatically to start the motor, an electromagnetic retarding device for said controller, and a relay operated by the motor current to effect changes in the retarding effect of said device, said relay having an off position which it assumes when the current is at or below normal running current and two operative positions which it assumes at higher current values to produce corresponding changes in the retarding effect of said device.

6. A control system for electric motors comprising a controller, means for causing said controller to advance automatically to start the motor, an electromagnetic retarding device for said controller having a variable field excitation which determines the retarding effect, and a relay operated by the motor current for varying the field excitation.

7. A control system for electric motors comprising a controller, means for causing said controller to advance automatically to start the motor, an electromagnetic retarding device for said controller having a winding for producing field excitation, a resistance in circuit with said winding to vary the excitation and produce different retarding effects, and a relay operated by the motor current to control the resistance.

8. A control system for electric motors comprising a controller, means for causing said controller to advance automatically to start the motor, an electromagnetic retarding device for said controller, and means for producing changes in the retarding effect comprising a relay operated by the motor current having an off position which it assumes when the operating current is at or below the normal running current in which position the retarding effect is a minimum and two operative positions which it assumes at higher current values to effect corresponding changes in the retarding device.

9. A control system for electric motors comprising a controller, means for causing said controller to advance automatically to start the motor, an electromagnetic retarding device for said controller having a winding for producing field excitation, an armature driven by the controller movable in said field, a resistance in the circuit of said winding, a relay operated by the motor current to vary the resistance of said relay in the off position which it assumes when the operating current is at or below normal running current in which position the field excitation is a minimum and two operative positions which it assumes at higher current values in which the field excitation is progressively increased.

In witness whereof, I have hereunto set my hand this 20th day of November 1914.

FRANK E. CASE.

Witnesses:
BENJAMIN B. HULL,
HELEN ORFORD.